(12) United States Patent
Gruner et al.

(10) Patent No.: US 11,447,233 B2
(45) Date of Patent: Sep. 20, 2022

(54) LOW LOAD SHEAR OUT AUXILIARY SUPPORT JOINT

(71) Applicant: The Boeing Company, Chicago, IL (US)

(72) Inventors: Bryan J. Gruner, Bellevue, WA (US); John Thomas B. Homrich, Seattle, WA (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 16/550,675

(22) Filed: Aug. 26, 2019

(65) Prior Publication Data

US 2021/0061441 A1 Mar. 4, 2021

(51) Int. Cl.
*B64C 9/02* (2006.01)
*B64C 9/18* (2006.01)

(52) U.S. Cl.
CPC . *B64C 9/02* (2013.01); *B64C 9/18* (2013.01)

(58) Field of Classification Search
CPC .... B64C 9/02; B64C 9/18; B64C 9/20; B64C 9/16; B64C 9/22; B64C 9/24; B64C 9/26; B64C 9/28
See application file for complete search history.

(56) References Cited

U.S. PATENT DOCUMENTS

| 2,423,984 | A | * | 7/1947 | Knoll | B64C 9/18 244/216 |
| 3,695,096 | A | * | 10/1972 | Kutsay | G01L 1/2225 73/761 |
| 4,763,862 | A | * | 8/1988 | Steinhauer | B64C 9/16 244/213 |
| 4,815,678 | A | * | 3/1989 | Gawne | B64C 25/00 244/1 OOR |
| 4,848,707 | A | * | 7/1989 | Britton | B64C 9/22 244/214 |
| 7,299,702 | B2 | * | 11/2007 | Gibert | B64C 9/02 73/802 |
| 9,296,473 | B2 | * | 3/2016 | Parker | B64C 9/14 |
| 9,963,237 | B2 | * | 5/2018 | Pretty | B64D 29/06 |
| 2007/0292062 | A1 | * | 12/2007 | Arnold | F16C 23/08 384/206 |
| 2019/0291851 | A1 | * | 9/2019 | Wagner | B64C 9/16 |

FOREIGN PATENT DOCUMENTS

| WO | WO-2005005251 A1 * | 1/2005 | B64C 9/20 |
| WO | WO-2017201267 A1 * | 11/2017 | F16H 25/20 |

* cited by examiner

*Primary Examiner* — Brady W Frazier
*Assistant Examiner* — Shanna Danielle Glover
(74) *Attorney, Agent, or Firm* — Felix L. Fischer

(57) ABSTRACT

A flap support structure incorporates an auxiliary flap support attachment fitting and an auxiliary flap support track. A primary load pin couples the auxiliary support track to the auxiliary flap support attachment fitting and reacts operating loads on the flap. At least one fuse pin extends through the primary load pin to limit translation of the primary load pin relative to the attachment fitting.

20 Claims, 14 Drawing Sheets

LOW LOAD SHEAR OUT AUXILIARY SUPPORT JOINT

REFERENCE TO RELATED APPLICATIONS

This application is copending with application Ser. No. 16/550,699 filed substantially concurrently herewith entitled SELF-ALIGNING LOW LOAD SHEAR OUT JOINT having a common assignee with the present application, the disclosure of which is incorporated herein by reference.

BACKGROUND INFORMATION

Field

This disclosure relates generally to the field of aircraft flap systems and, more particularly, to a flap deployment system having an auxiliary support with load aligned fuse pins for jam mitigation.

Background

Aircraft employ flaps which deploy to increase camber and chord of the wings for enhanced aerodynamic efficiency in take-off and landing. In modern flap configurations, one or more auxiliary flap supports or deflection control tracks may be used to balance loads or prevent excessive flap deflection under load, such tracks should not inhibit the ability of the flap to extend and retract during operation. Furthermore, such tracks should not be the cause of an inadvertent mechanical jam which could lead to less than optimal performance of the flaps. In prior systems, fuse pins have been employed to yield or shear at a specific load, and thus enable controlled separation of auxiliary track and flap while allowing the main support tracks and actuators to operate the flap. However, these fuse pins are typically sized for high operating loads, resulting in correspondingly high fusing loads. This involves surrounding structure that is sufficiently strong and rigid enough to impart requisite fusing forces to enable controlled separation. However, with certain arrangements of auxiliary supports, the typical operating load on the auxiliary support can be an appreciable portion of the total load on the flap. Therefore, the fusing loads may substantially impact the overall design of the flap and may be the principle sizing load case for the flap, adding considerable weight and cost to the flap and support structure.

SUMMARY

Exemplary implementations of a flap support structure incorporate a flap support attachment fitting and a flap support track. A primary load pin couples the flap support track to the flap support attachment fitting and reacts operating loads on the flap. At least one fuse pin extends through the primary load pin to limit translation of the primary load pin relative to the attachment fitting.

The exemplary implementations provide a method for fusing of shear out loading on an auxiliary flap support attachment fitting. Operating loads on a flap are reacted by a primary load pin coupling an auxiliary support track to a flap support attachment fitting. Flap operating loads induced on the primary load pin by the auxiliary flap support track are reacted with at least one fuse pin extending through the primary load pin to limit translation of the primary load pin relative to the flap support attachment fitting. The at least one fuse pin fractures responsive to a jam of the auxiliary support track imposing a shear out load on the flap support attachment fitting.

BRIEF DESCRIPTION OF THE DRAWINGS

The features, functions, and advantages that have been discussed can be achieved independently in various implementations of the present invention or may be combined in yet other implementations further details of which can be seen with reference to the following description and drawings.

DETAILED DESCRIPTION

The implementations described herein provide an auxiliary flap support attachment fitting and fuse pin arrangement for an auxiliary flap support that overcomes the issues in the existing structures. In an example implementation, an auxiliary track is coupled to the auxiliary flap support attachment fitting with a primary load pin contained within slots on inner walls of fitting extension, and prevented from translating from the nominal position in the slots by one or more low load fuse pins enabling substantial reduction in fusing load in the event that the auxiliary track becomes jammed, and the flaps are commanded to either retract or deploy.

Figure 1A:
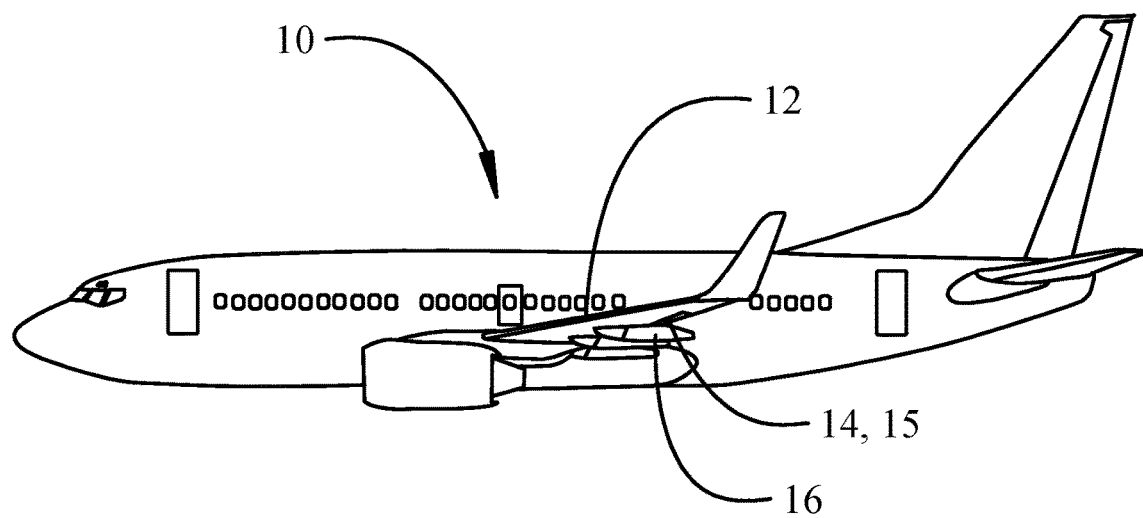
FIG. 1A is a representation of an aircraft in which the implementations disclosed herein may be employed.
Figure 1B:
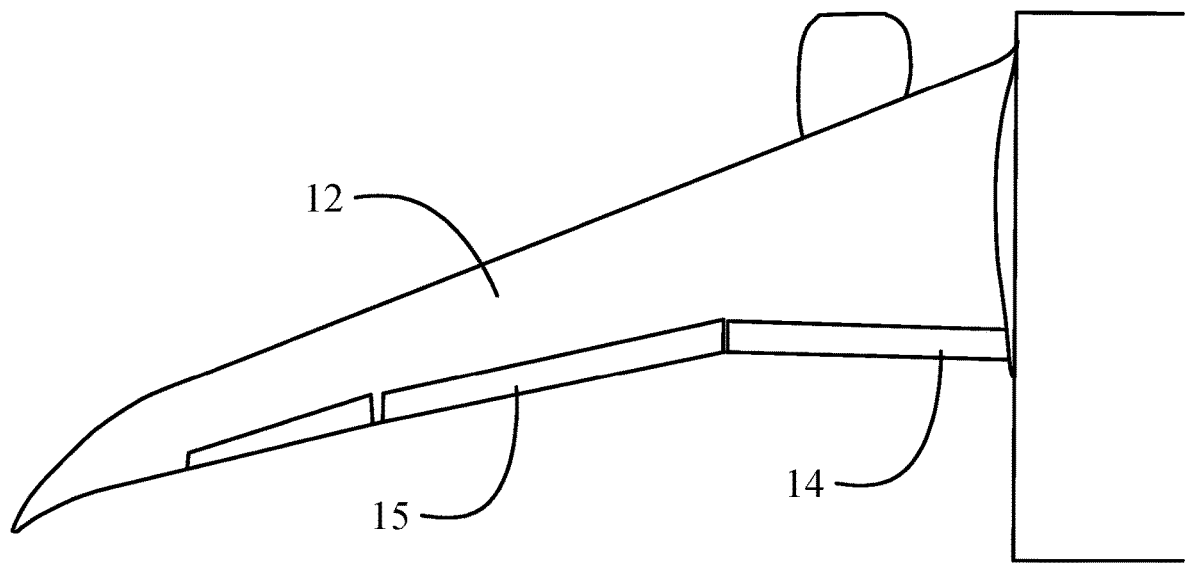
FIG. 1B is a top view of the wing and flaps of FIG. 1B.
Figure 2A:
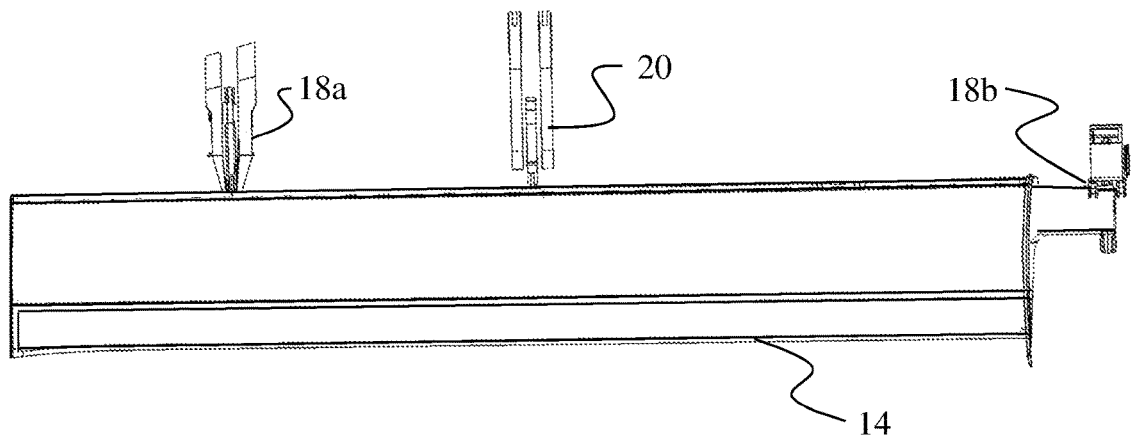
FIG. 2A is a top view of the inboard flap and supports.
Figure 2B:
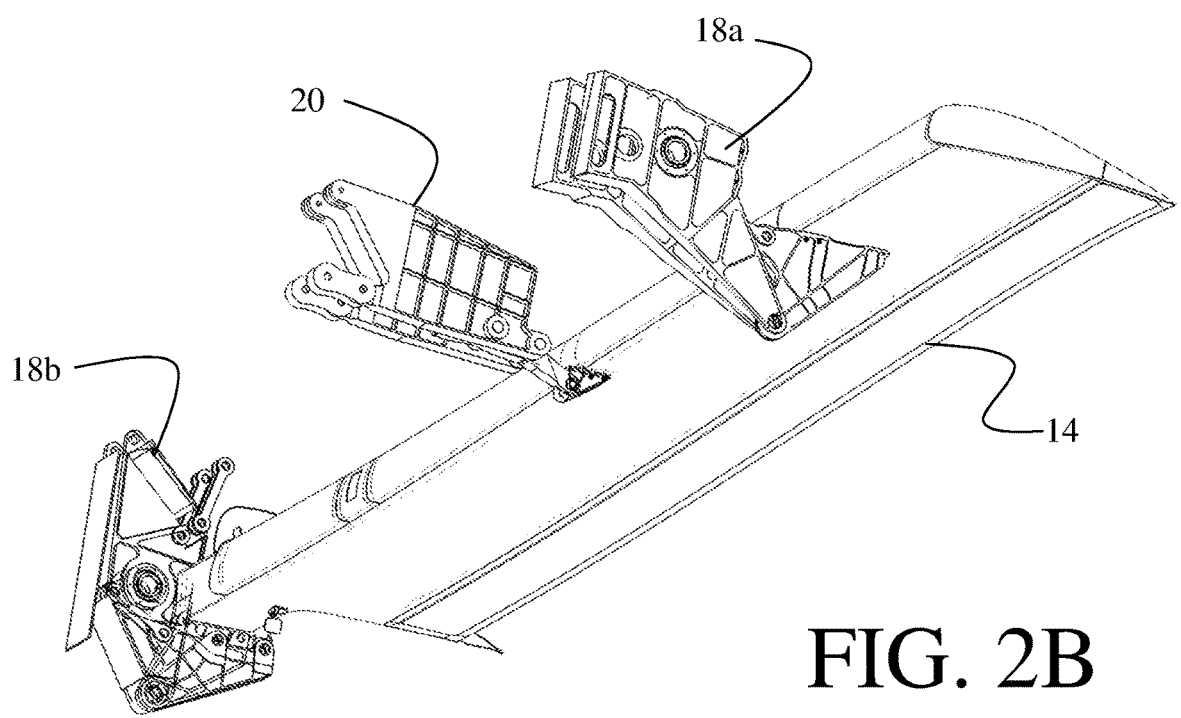
FIG. 2B is a lower front pictorial view of the main flap and supports.

Referring to the drawings, FIGS. 1A-1B depict an aircraft 10 having a wing 12 with an operating flap system, for the example shown, inboard flap 14 and outboard flap 15. The flaps 14, 15 are engaged to the wing 12 with multiple attachment supports partially housed within fairings 16. Extension of the flaps 14, 15 to enhance aerodynamic performance during takeoff and landing is accomplished with a flap deployment system that causes the flaps 14, 15 to rotate aft and downward relative to the wing 12. The attachment supports for the inboard flap 14 are shown in FIGS. 2A and 2B. While described herein with respect to inboard flap 14, the implementations are equally applicable to outboard flap 15. In the example configuration shown in the drawings, flap 14 is supported by an outboard primary support 18a, with an actuator driven mechanism, and an inboard primary support 18b, also having an actuator driven mechanism. A passively operating midspan auxiliary support 20 provides deflection control and balances the loads on the flap intermediate the two primary supports.

Figure 3A:
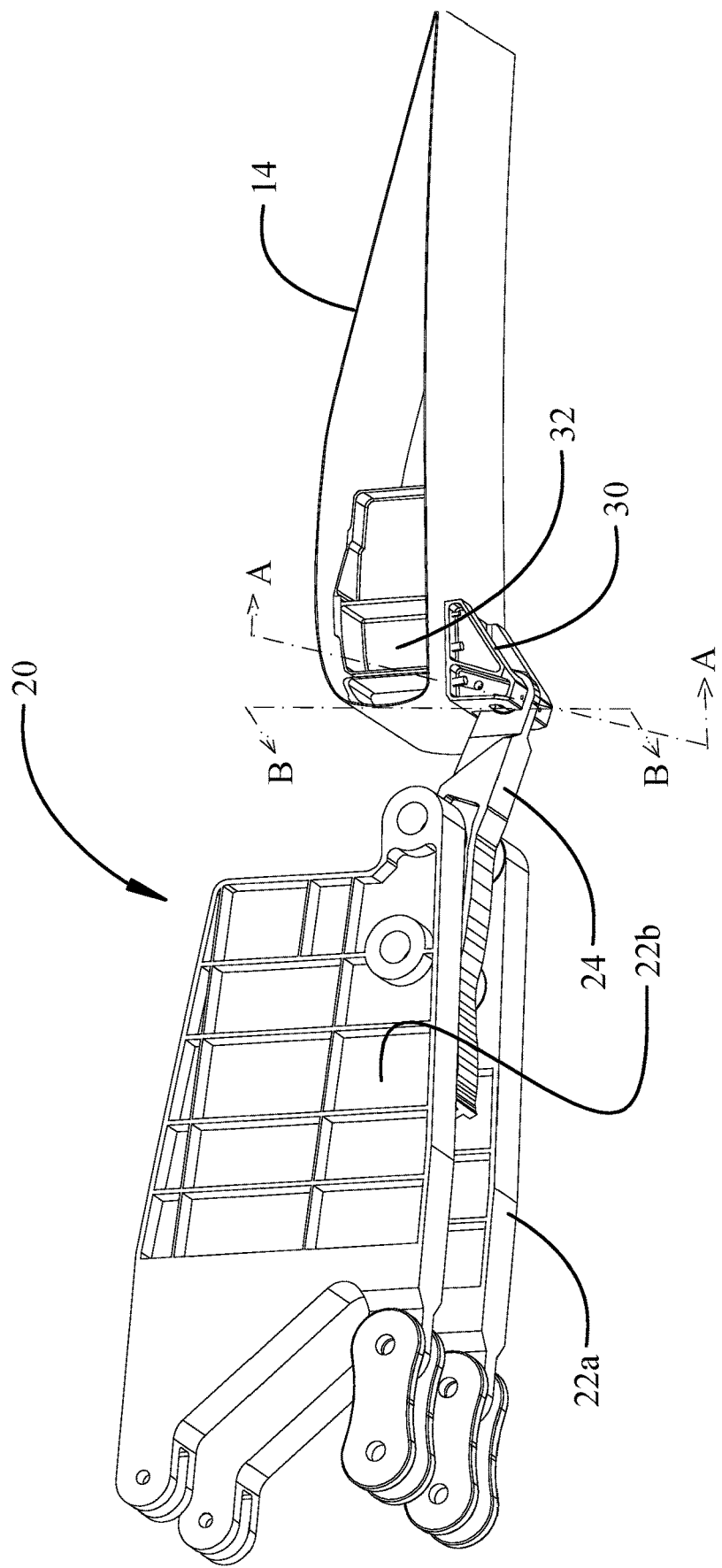
FIG. 3A is a lower front pictorial view of the auxiliary support as attached to the flap.
Figure 3B:
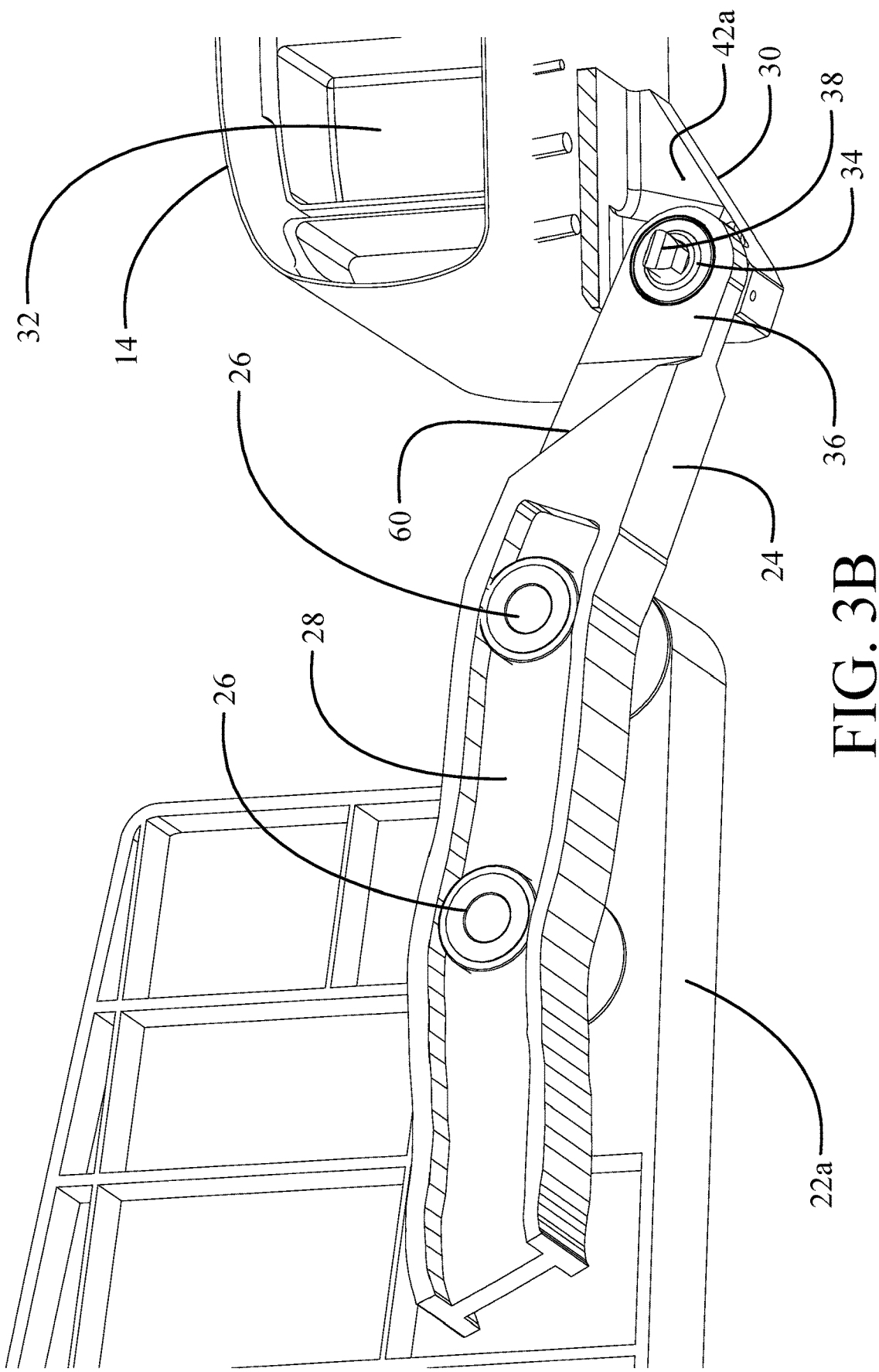
FIG. 3B is a detailed pictorial view of the auxiliary support with the outboard support rib removed to display the track and the auxiliary flap support attachment fitting sectioned along line A-A in FIG. 3A to show the load pin and bearing.

FIGS. 3A and 3B show details of a flap support structure such as the auxiliary support 20 which employs inboard and outboard support ribs 22a, 22b attached to structure of the wing 12. An auxiliary flap support track 24 is engaged between the support ribs 22a, 22b on rollers 26 received in extension profile cutouts 28 (best seen in FIG. 3B with the outboard support rib removed for clarity). A flap support attachment fitting 30 is mounted to structural supports in the flap 14, such as flap rib 32 for the example in the drawings. A spherical bearing 34 in an aft lug 36 of the auxiliary flap support track 24 is engaged by a primary load pin 38 carried in the flap support attachment fitting 30.

Figure 4A:
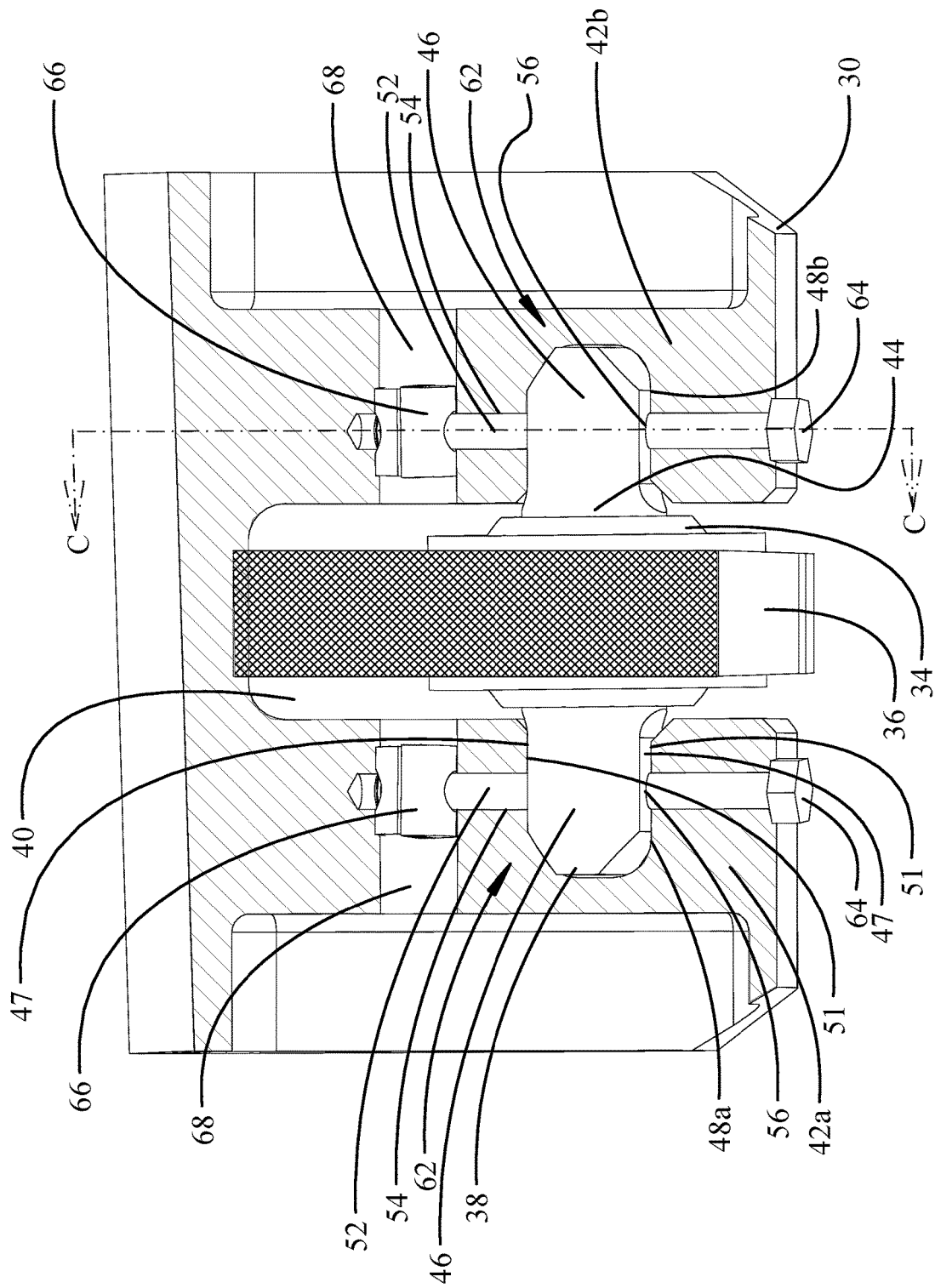
FIG. 4A is a detailed front section view of a first example implementation of the auxiliary flap support attachment fitting along line B-B of FIG. 3A showing the primary load pin engaged in the auxiliary flap support attachment fitting support slots and two transverse fuse pin assemblies engaging the primary load pin and auxiliary flap support attachment fitting.
Figure 4B:
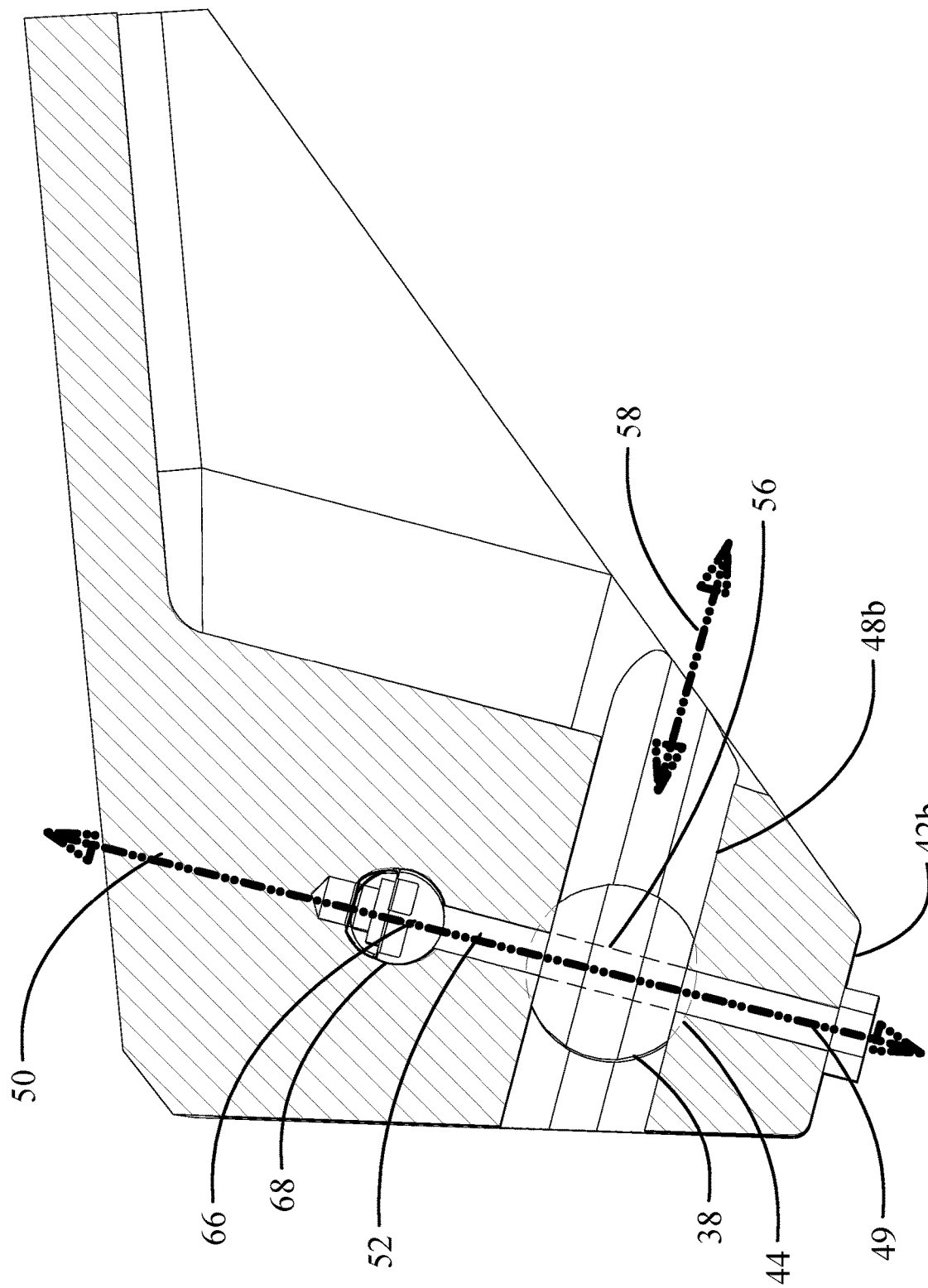
FIG. 4B is a detailed side section view of the auxiliary flap support attachment fitting along line C-C of FIG. 4A showing the load pin engaged in the outboard support slot and the outboard fuse pin assembly.

As seen in FIGS. 4A and 4B, the auxiliary flap support attachment fitting 30 incorporates a central channel 40 between an inboard fitting extension 42a and an outboard fitting extension 42b to receive the aft lug 36 of the auxiliary flap support track 24 and the associated spherical bearing 34. The primary load pin 38 is received through and is engaged by the spherical bearing 34 on a cylindrical central portion 44. The primary load pin 38 has end portions 46 engaged in an inboard slot 48a in the inboard fitting extension 42a and an outboard slot 48b in the outboard fitting extension 42b. The primary load pin 38 provide reaction force 49 to react operating loads 50, which are primarily air loads, coupled into the flap support attachment fitting 30 by the flap 14.

In a first example implementation, the primary load pin 38 is restrained from translating along the inboard and outboard slots 48a, 48b by two transverse fuse pins 52 received through pin receiving bores 54 in the inboard and outboard fitting extensions 42a, 42b and mating bores 56 in the end portions 46. In an operating condition in which the auxiliary flap support track 24 is not jammed, mating bores 56 are concentrically aligned with the pin receiving bores 54. Additional fuse pins for redundancy may be used in alternative implementations. Inboard and outboard slots 48a, 48b are aligned with flap deployment loads 58 induced by the auxiliary flap support track 24 on the auxiliary flap support attachment fitting 30 and the transverse fuse pins 52 are aligned transverse to the inboard and outboard slots 48a, 48b to react shear forces in the direction of the deployment loads 58 along the slots. In the example implementation shown in the drawings, end portions 46 of the primary load pin 38 have opposing flats 47 received on upper and lower surfaces 51 of the slots 48a, 48b to facilitate alignment of the pin receiving bores 54 and mating bores 56 for insertion of the fuse pins 52. The flats 47 additionally prevent rotation of the primary load pin 38 in the slots 48a, 48b to avoid rotationally induced shear loads on the fuse pins 52. The flats 47 further constrain motion of the primary load pin 38 parallel to the slots 48a, 48b during translation of the pin as described in detail subsequently.

For the example implementations, the flap deployment loads 58 are approximately normal to the operating loads 50 and associated reaction force 49 of the primary load pin 38. The transverse fuse pins 52 are perpendicular to the inboard and outboard slots 48a, 48b and, therefore, substantially parallel to the operating loads 50 minimizing shear loading of the transverse fuse pins by the operating loads. The transverse fuse pins 52 are configured to fracture at a predetermined shear out load in the direction of the deployment loads 58. In the event of a jam of the auxiliary flap support track 24, a shear out load is induced between the primary load pin 38 and the auxiliary flap support attachment fitting 30 causing the transverse fuse pins 52 to fracture allowing the end portions 46 of the primary load pin 38 to translate along the inboard and outboard slots to eliminate any less-than-optimal loading on the overall flap structure.

Figure 5:
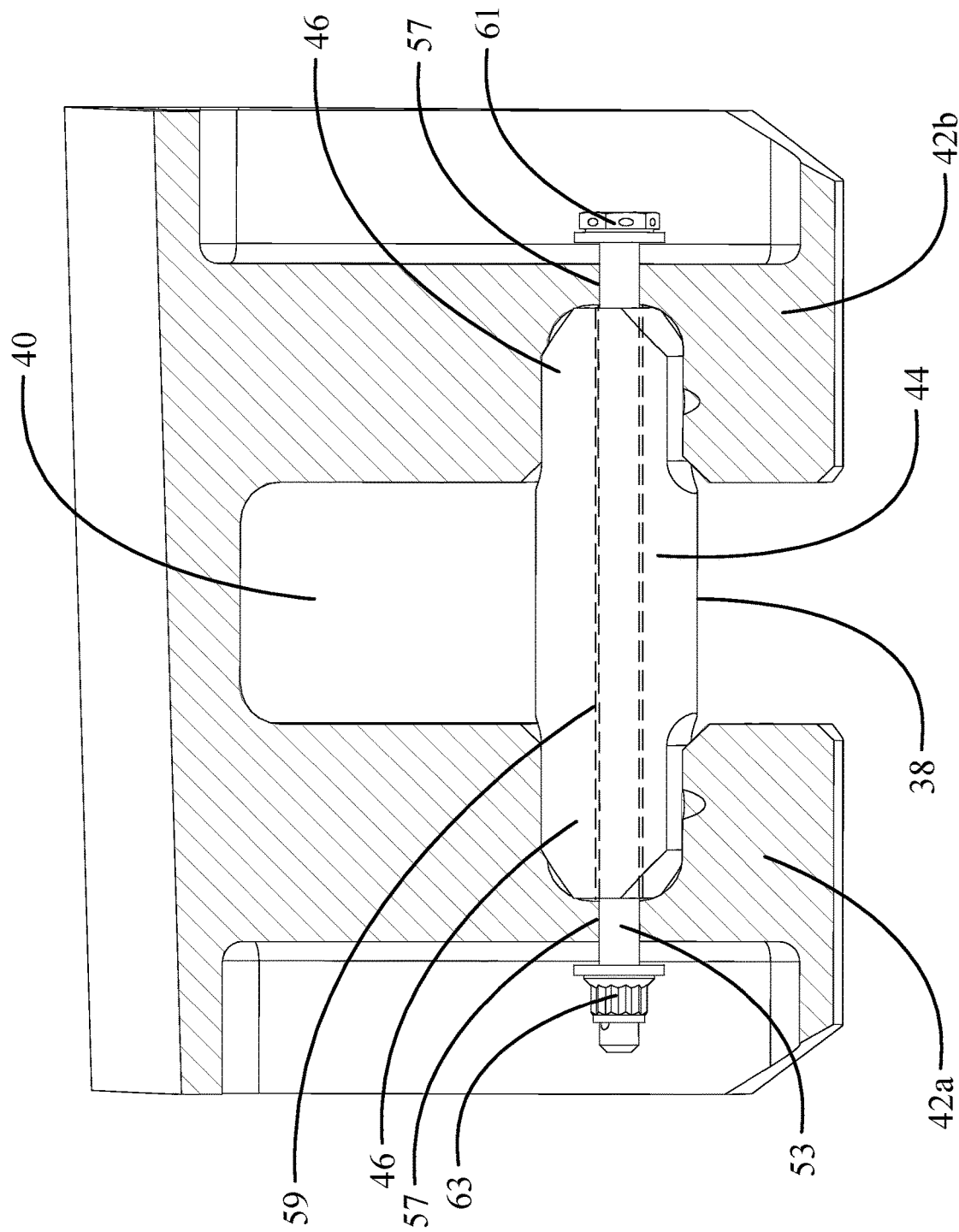
FIG. 5 is a detailed front section view of a second implementation of the auxiliary flap support attachment fitting and primary load pin employing an axially aligned transverse fuse pin.

A second implementation of the auxiliary flap support attachment fitting and fuse pin arrangement is shown in FIG. 5 (with the auxiliary flap support track 24 and spherical bearing 34 removed for clarity). A single axial fuse pin 53 is received through lateral pin bores 57 in the inboard and outboard fitting extensions 42a, 42b and an axial bore 59 in the primary load pin 38. The axial fuse pin 53 is constrained in the lateral pin bores 57 with a head 61 and a nut 63 or two nuts. In an operating condition in which the auxiliary flap support track 24 is not jammed, the lateral pin bores 57 are concentrically aligned with the axial bore 59. The axial fuse pin 53, aligned with the axis of the primary load pin 38, is perpendicular to both operating loads 50 normal to the inboard and outboard slots 48a, 48b and deployment loads 58 parallel to the inboard and outboard slots 48a, 48b. The axial fuse pin 53 is configured to fracture at a predetermined shear out load in the direction of the deployment loads 58. In the event of a jam of the auxiliary flap support track 24, a shear out load is induced between the primary load pin 38 and the auxiliary flap support attachment fitting 30 causing the axial fuse pin 53 to fracture allowing the end portions 46 of the primary load pin 38 to translate along the inboard and outboard slots 48a, 48b to eliminate any less-than-optimal loading on the overall flap structure.

Figure 6A:
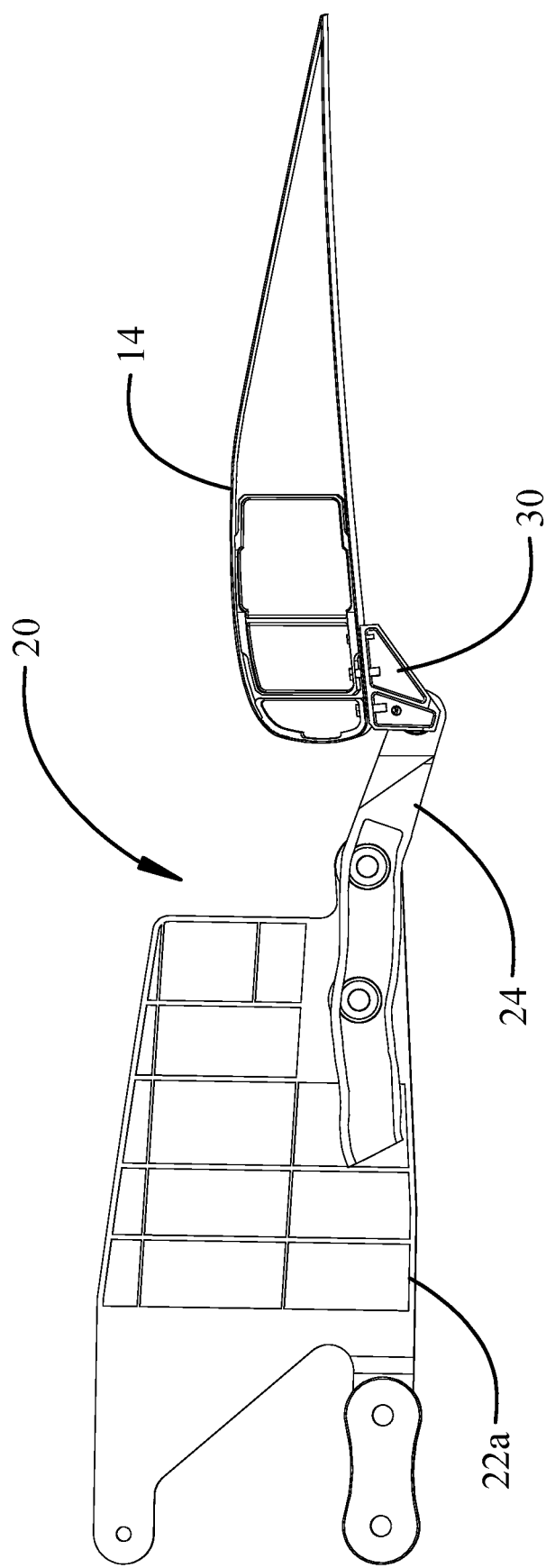
FIG. 6A-C are side pictorial views of the flap and auxiliary flap support attach fitting sequentially disengaging from the track after fracture of the one or more fuse pins and exit of the primary load pin from the auxiliary flap support attachment fitting support slots aft during deployment of the flap.
Figure 6B:
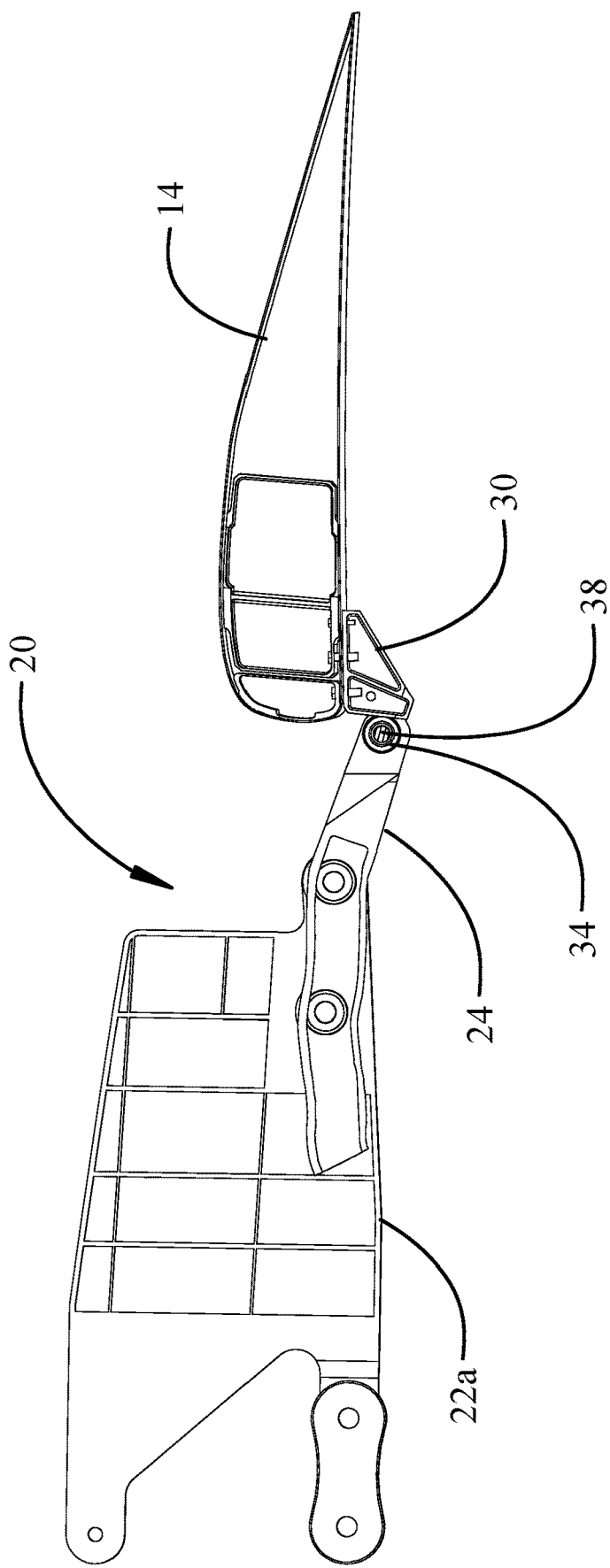
Figure 6C:
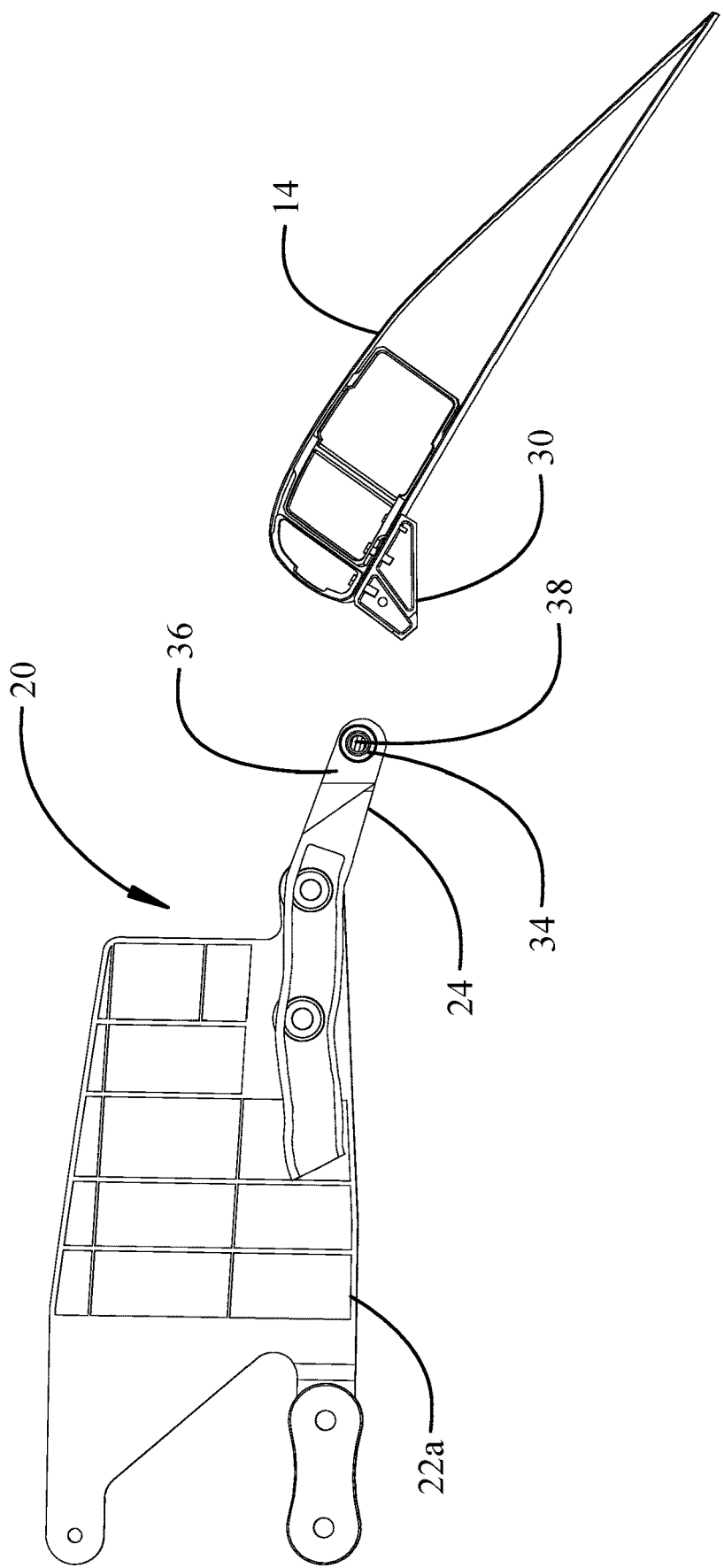
Figure 7A:
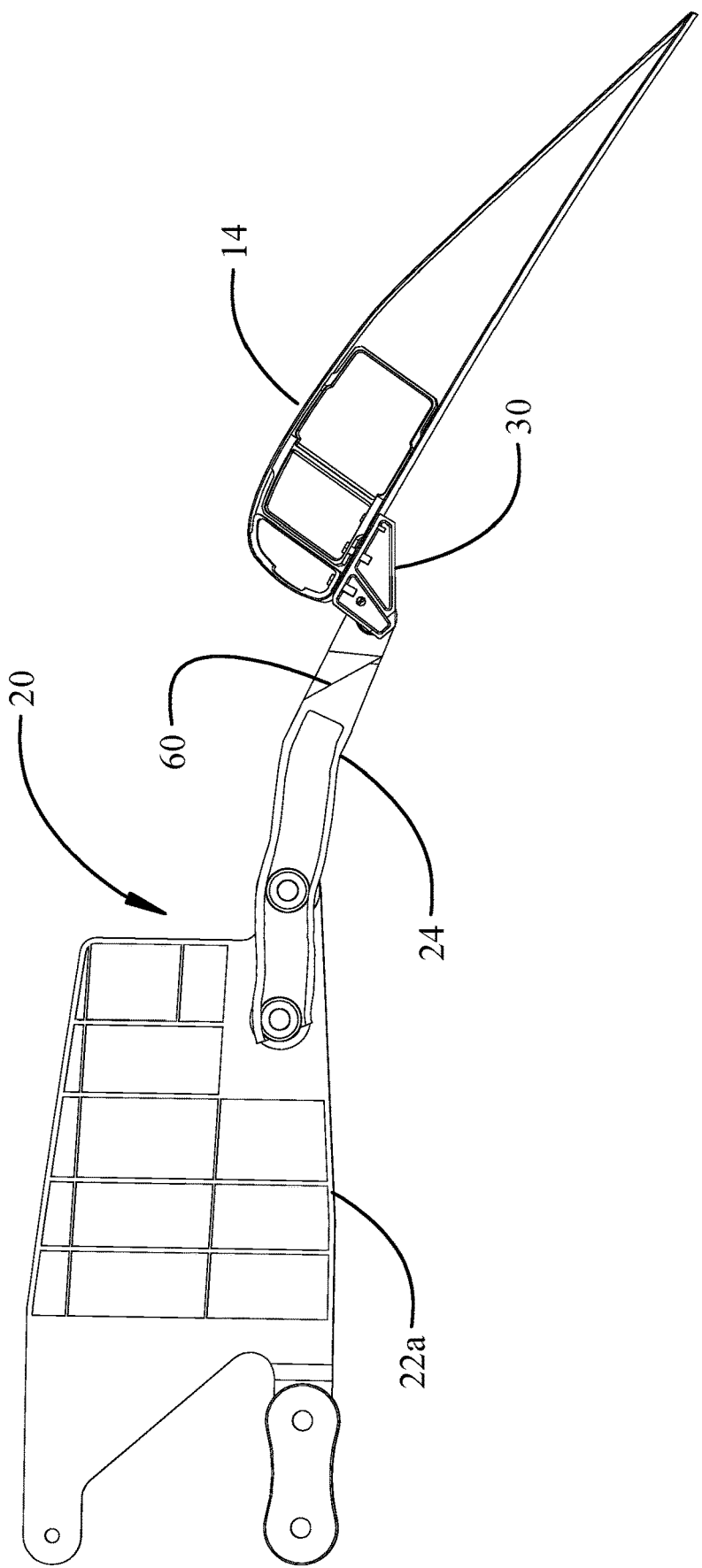
FIG. 7A-C are side pictorial views of the flap and auxiliary flap support attachment fitting disengaging from the track after fracture of the one or more fuse pins and exit of the load pin from the auxiliary flap support attachment fitting support slots forward during retraction of the flap with the auxiliary flap support attach fitting contacting the jam ramp on the track; and, FIG. 8 is a flow chart of a method for fusing of shear out loading on an auxiliary flap support attachment fitting using the exemplary implementations.
Figure 7B:
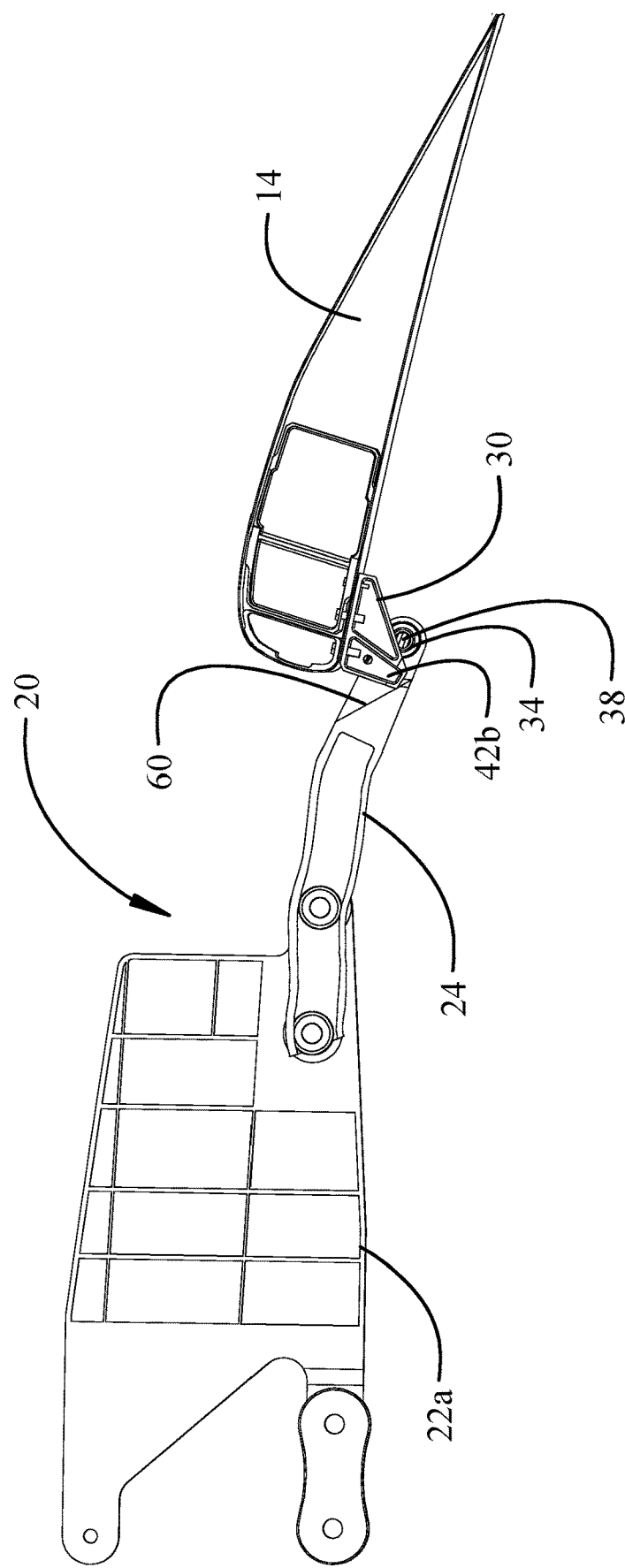
Figure 7C:
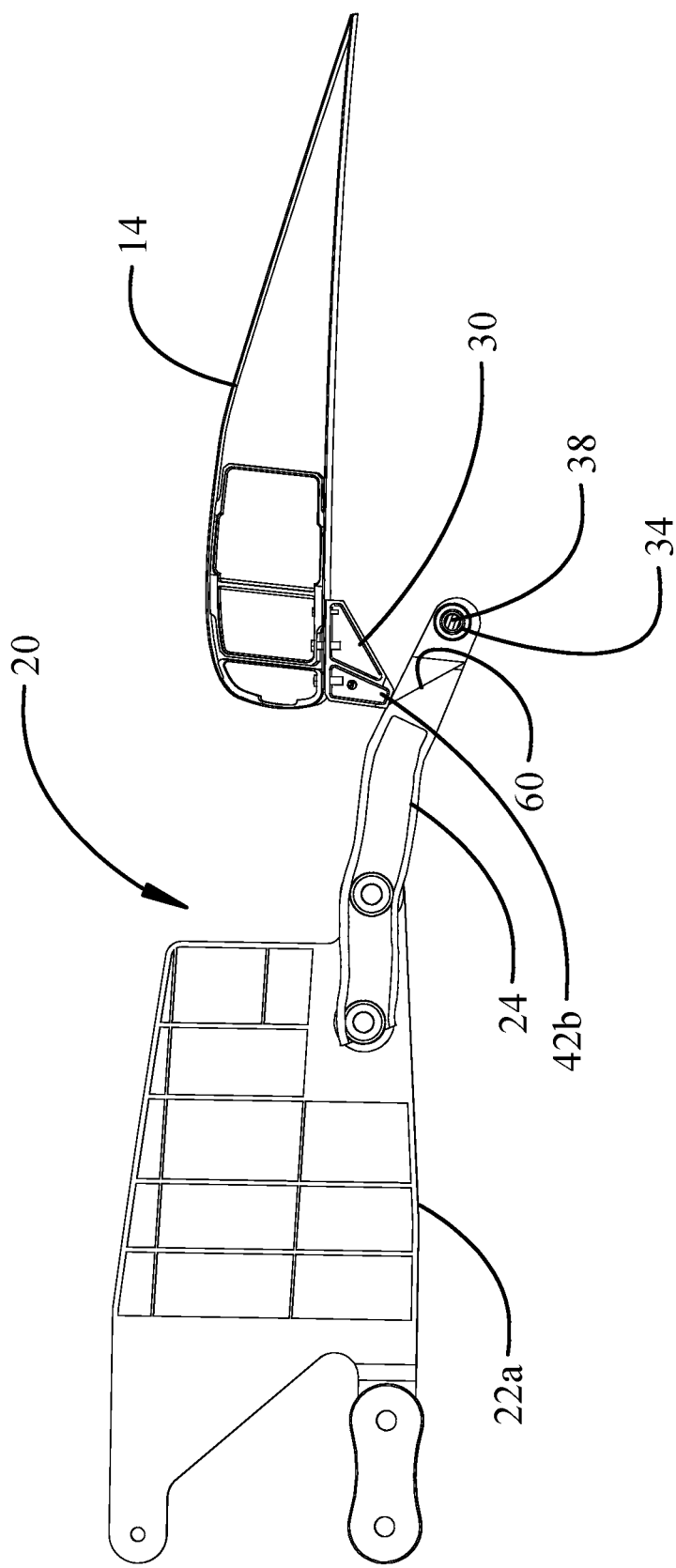

In a condition where a jam occurs as the flap 14 is being deployed, the jammed auxiliary flap support track 24 constrains the primary load pin 38 in the spherical bearing 34 with the transverse fuse pins 52 or axial fuse pin 53 resisting the motion of the auxiliary flap support fitting until the force is high enough to fracture the fuse pins. This results in the auxiliary flap support track 24 drawing the end portions 46 of the primary load pin 38 forward through the slots to exit the auxiliary flap support attachment fitting 30 at the forward end of the slots 48a, 48b allowing the flap 14 to continue to deploy as depicted in FIGS. 6A-6C. In a condition where the flap 14 is being retracted from a deployed position and the auxiliary flap support track jams as depicted in FIGS. 7A-7C, the aft lug 36 constrains the primary load pin 38 in the spherical bearing 34 urging the end portions 46 aft through the slots 48a, 48b to exit the auxiliary flap support attachment fitting 30 at the aft end of the slots allowing the flap to continue to retract. A ramp 60 is employed for engaging the flap support attachment fitting in a jam condition. As best seen tin FIG. 3B, the ramp 60 on the auxiliary flap support track 24 proximate the aft lug 36 engages the inboard and outboard fitting extensions, 42a, 42b to direct the flap support attachment fitting 30 over the jammed auxiliary flap support track 24 to allow substantially nominal retraction of the flap 14. Contrary to typical single pin joints between auxiliary support tracks and auxiliary flap support attachment fittings, which are designed for fusing capability with fusing loads greater than ultimate flight loads or actuator torque break settings, the present implementations primarily accommodate load capability in the primary load pin to react flap operating loads. Shear out during track jam by fracturing the fuse pins can thus occur at a much lower load level and consequently the overall flap and support structure is not sized by jam loads and total weight can be reduced.

Returning to FIGS. 4A and 4B, in an example implementation, the transverse fuse pins 52 are incorporated in fuse pin assemblies 62 having fastener heads 64 at a first end of the fuse pins constraining the pins at an interface of the pin receiving bores 54. Nuts, barrel nuts 66 in the example implementation, are received in lateral bores 68 in the fitting extensions 42a, 42b to align with the pin receiving bores 54 allowing threaded engagement of the transverse fuse pins 52 to constrain the transverse fuse pins in the flap support attachment fitting 30.

Figure 8:
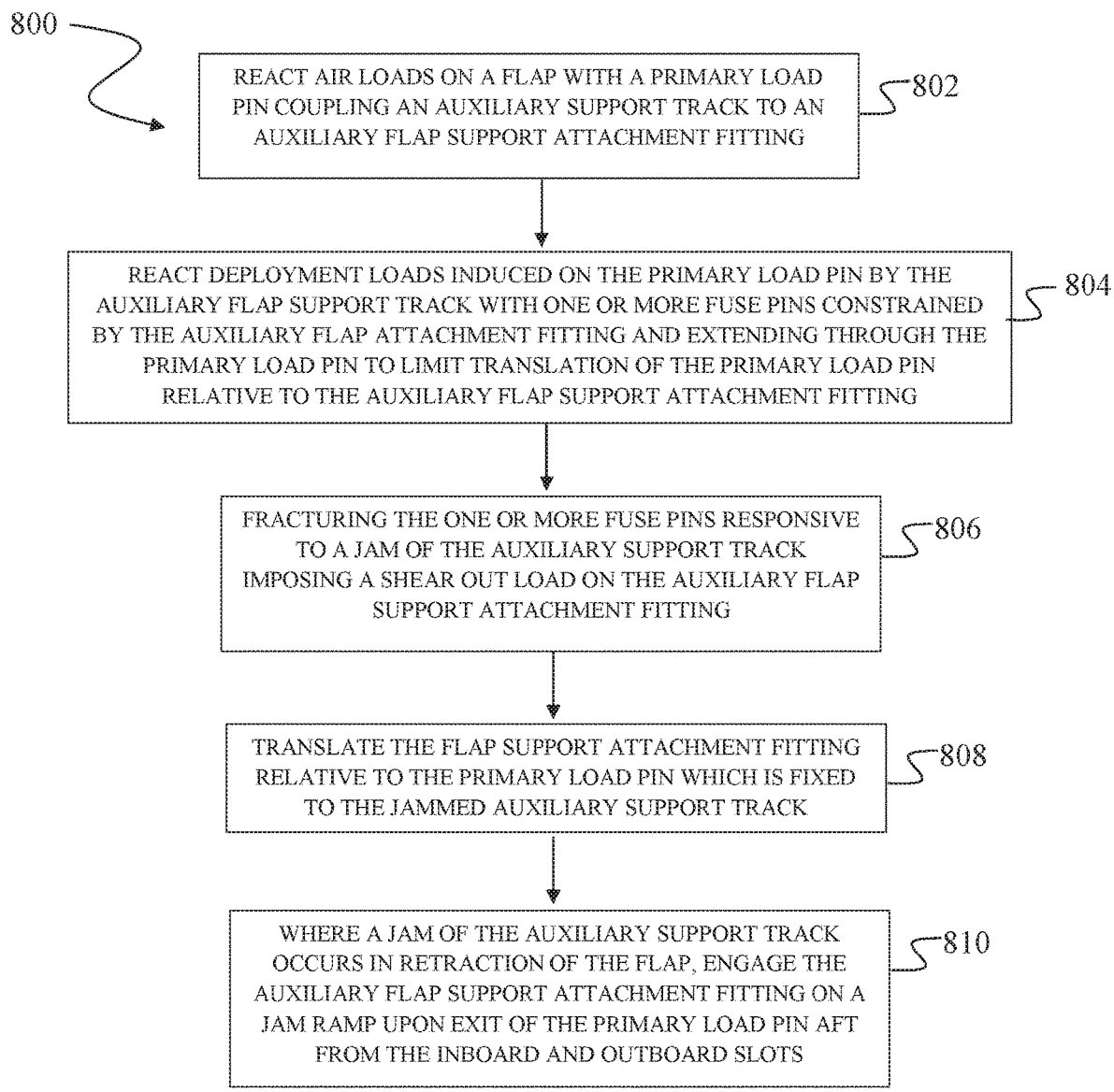

The implementations disclosed herein provide a method 800 for fusing the attachment of an auxiliary flap support track and auxiliary flap support attachment fitting as shown in FIG. 8. Operating loads on a flap 14 are reacted with a primary load pin 38 coupling an auxiliary flap support track 24 to an auxiliary flap support attachment fitting 30, step 802. Operating loads 50 reacted by the primary load pin 38 are substantially normal to the inboard and outboard slots 48a, 48b.

Deployment loads 58 induced on the primary load pin 38 by the auxiliary flap support track 24 are reacted with one or more fuse pins constrained by the auxiliary flap support attachment fitting 30 and extending through the primary load pin 38 to limit translation of the primary load pin relative to the auxiliary flap support attachment fitting 30, step 804. Within the example implementations, the one or more fuse pins include transverse fuse pins 52 or axial fuse pin 53. Shear loads in the direction of deployment loads 58 reacted by the transverse fuse pins 52 or axial fuse pin 53 are substantially aligned with inboard and outboard slots 48a, 48b.

The one or more fuse pins 52, 53 fracture responsive to a jam of the auxiliary flap support track 24 imposing a shear out load on the auxiliary flap support attachment fitting 30, step 806. The primary load pin 38 is no longer attached to the auxiliary flap support attachment fitting allowing the auxiliary flap support attachment fitting 30 to translate relative to the primary load pin 38 which is fixed to the jammed auxiliary flap support track 24, step 808. Where a jam of the auxiliary flap support track 24 occurs in retraction of the flap 14, the auxiliary flap support attachment fitting 30 is engaged on a ramp 60 upon exit of the primary load pin 38 aft from the inboard and outboard slots 48a, 48b, step 810.

Having now described various implementations of the invention in detail as required by the patent statutes, those skilled in the art will recognize modifications and substitutions to the specific implementations disclosed herein. Such modifications are within the scope and intent of the following claims. Within the claims and the specification, the terms "comprising", "incorporate", "incorporates" or "incorporating", "include", "includes" or "including", "has", "have" or "having", and "contain", "contains" or "containing" are intended to be open and additional or equivalent elements may be present.

What is claimed is:

1. A flap support structure comprising:
   a flap support attachment fitting;
   a flap support track;
   a primary load pin coupling the flap support track to the flap support attachment fitting, said primary load pin transverse to the flap support attachment fitting reacting operating loads; and
   at least one fuse pin extending through the primary load pin to limit translation of the primary load pin relative to the attachment fitting, the flap support attachment fitting configured for translation of the primary load pin aligned with flap deployment loads upon fracture of the at least one fuse pin.

2. The flap support structure as defined in claim 1 wherein the primary load pin is engaged in inboard and outboard slots in the flap support attachment fitting.

3. The flap support structure as defined in claim 2 wherein the at least one fuse pin is configured to fracture when subject to a shear out load, said primary load pin translating in the inboard and outboard slots upon shearing of the at least one fuse pin.

4. The flap support structure as defined in claim 3 further comprising a spherical bearing mounted in the flap support track wherein the primary load pin is received through the spherical bearing and has end portions received in the inboard and outboard slots.

5. The flap support structure as defined in claim 4 wherein the end portions of the primary load pin have opposing flats received on upper and lower surfaces of the inboard and outboard slots.

6. The flap support structure as defined in claim 4 wherein the flap support attachment fitting further comprises a central channel between an inboard fitting extension and an outboard fitting extension, the central channel receiving an aft lug of the flap support track, the spherical bearing mounted in the aft lug.

7. The flap support structure as defined in claim 6 wherein the at least one fuse pin comprises two transverse fuse pins received through pin receiving bores in the inboard and outboard fitting extensions and mating bores in the end portions, wherein in an operating condition in which the flap support track is not jammed, the mating bores are concentrically aligned with the pin receiving bores.

8. The flap support structure as defined in claim 7 wherein the inboard and outboard slots are aligned with flap deployment loads induced by the flap support track on the flap support attachment fitting and the transverse fuse pins are aligned transverse to the inboard and outboard slots to react shear forces along the inboard and outboard slots.

9. The flap support structure as defined in claim 7 wherein the transverse fuse pins are incorporated in fuse pin assemblies having
   heads at a first end of the transverse fuse pins constraining the transverse fuse pins at an interface of the receiving bores; and,
   nuts received in lateral bores in the inboard and outboard fitting extensions to align with the pin receiving bores allowing threaded engagement of the transverse fuse pins to constrain the transverse fuse pins in the flap support attachment fitting.

10. The flap support structure as defined in claim 6 wherein the at least one fuse pin comprises an axial fuse pin received through lateral pin bores in the inboard and outboard fitting extensions and extending through an axial bore in the primary load pin, wherein in an operating condition in which the flap support track is not jammed, the lateral pin bores are concentrically aligned with the axial bore.

11. The flap support structure as defined in claim 3 further comprising a ramp on the flap support track, the ramp engaging the flap support attachment fitting in a jam condition upon translation of the primary load pin out of an aft end of the inboard and outboard slots.

12. An operating flap system for an aircraft, said system comprising:
   a flap supported by at least one primary support with an actuator driven mechanism and a passively operating auxiliary support providing deflection control and carrying loads from the flap;
   an auxiliary flap support track operatively engaged by the auxiliary support and configured to extend upon deployment of the flap and retract upon retraction of the flap;
   an auxiliary flap support attachment fitting;
   a primary load pin coupling the auxiliary support track to the auxiliary flap support attachment fitting, said primary load pin transverse to the auxiliary flap support attachment fitting reacting operating loads on the flap; and
   at least one fuse pin extending through the primary load pin to limit translation of the primary load pin relative to the attachment fitting, said at least one fuse pin reacting shear loads induced on the primary load pin by the auxiliary flap support track, the auxiliary flap support attachment fitting configured for translation of the primary load pin aligned with flap deployment loads upon fracture of the at least one fuse pin.

13. The operating flap system as defined in claim 12 wherein the primary load pin is engaged in inboard and outboard slots in the auxiliary flap support attachment fitting, and further comprising a spherical bearing mounted in the auxiliary flap support track wherein the primary load pin is received through the spherical bearing and has end portions received in the inboard and outboard slots, the end portions having opposing flats received on upper and lower surfaces of the inboard and outboard slots, and wherein the at least one fuse pin is configured to fracture when subject to a shear out load, said primary load pin translating in the inboard and outboard slots upon shearing of the at least one fuse pin.

14. The operating flap system as defined in claim 13 wherein the auxiliary flap support attachment fitting further comprises a central channel between an inboard fitting extension and an outboard fitting extension, the central channel receiving an aft lug of the auxiliary flap support track, the spherical bearing mounted in the aft lug.

15. The operating flap system as defined in claim 13 wherein the at least one fuse pin comprises two transverse fuse pins received through pin receiving bores in the inboard and outboard fitting extensions and mating bores in the end portions, wherein in an operating condition in which the auxiliary flap support track is not jammed, the mating bores are concentrically aligned with the pin receiving bores and the fuse pins are incorporated in fuse pin assemblies having heads at a first end of the transverse fuse pins constraining the transverse fuse pins at an interface of the pin receiving bores; and,
   nuts received in lateral bores in the inboard and outboard fitting extensions to align with the pin receiving bores allowing threaded engagement of the transverse fuse pins to constrain the transverse fuse pins in the auxiliary flap support attachment fitting, wherein the inboard and outboard slots are aligned with flap operating loads induced by the auxiliary flap support track on the auxiliary flap support attachment fitting and the transverse fuse pins are aligned transverse to the inboard and outboard slots to react shear forces along the inboard and outboard slots, said transverse fuse pins configured to fracture responsive to a shear out load to allow translation of the primary load pin in the inboard and outboard slots.

16. The operating flap system as defined in claim 14 further comprising a ramp on the auxiliary flap support track, the ramp engaging the auxiliary flap support attachment fitting in a jam condition upon translation of the primary load pin out of an aft end of the inboard and outboard slots.

17. A method for fusing of shear out loading on an auxiliary flap support attachment fitting, said method comprising:
   reacting operating loads on a flap with a primary load pin coupling an auxiliary support track to the auxiliary flap support attachment fitting and transverse to the auxiliary flap support attachment fitting;
   reacting flap deployment loads induced on the primary load pin by the auxiliary flap support track with at least one fuse pin extending through the primary load pin to limit translation of the primary load pin relative to the auxiliary flap support attachment fitting;
   fracturing the at least one fuse pin responsive to a jam of the auxiliary support track imposing a shear out load on the pin and the auxiliary flap support attachment fitting; and,
   translating the primary load pin in the auxiliary flap support attachment fitting aligned with flap deployment loads.

18. The method as defined in claim 17 wherein the step of translating the primary load pin in the auxiliary flap support attachment fitting aligned with flap deployment loads further comprises translating the primary load pin in inboard and outboard slots in the auxiliary flap support attachment fitting.

19. The method of claim 18 further comprising engaging the auxiliary flap support attachment fitting on a jam ramp upon exit of the primary load pin aft from the inboard and outboard slots.

20. The method of claim 18 wherein the step of reacting operating loads on the flap comprises reacting operating loads normal to the inboard and outboard slots with the primary load pin and wherein the at least one fuse pin comprises two transverse fuse pins and the step of reacting flap deployment loads comprises reacting shear loads aligned with inboard and outboard slots with the transverse fuse pins.

* * * * *